(12) United States Patent
Fleischhacker

(10) Patent No.: US 11,677,441 B2
(45) Date of Patent: Jun. 13, 2023

(54) POWER LINE COMMUNICATION SYSTEM

(71) Applicant: NXP B.V., Eindhoven (NL)

(72) Inventor: Jens Fleischhacker, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/651,871

(22) Filed: Feb. 21, 2022

(65) Prior Publication Data
US 2022/0294492 A1    Sep. 15, 2022

(30) Foreign Application Priority Data

Mar. 15, 2021 (EP) ..................................... 21162612

(51) Int. Cl.
*H04B 3/54* (2006.01)
*H04L 12/40* (2006.01)

(52) U.S. Cl.
CPC .............. *H04B 3/544* (2013.01); *H04L 12/40* (2013.01); *H04L 2012/40215* (2013.01); *H04L 2012/40273* (2013.01)

(58) Field of Classification Search
CPC ........... H04B 3/544; H04B 3/54; H04L 12/40; H04L 2012/40215; H04L 63/1408; H04L 2012/40273; H04W 4/40
See application file for complete search history.

(56) References Cited

U.S. PATENT DOCUMENTS 7,813,706 B2 * 10/2010 St. Germain ....... H04L 25/0298
333/32
8,054,303 B2 * 11/2011 Saeki ................. H04L 25/0276
455/566

(Continued)

OTHER PUBLICATIONS

Aunkofer, M., "Interface TGS discrete Specification of the discrete communication interface for Kessy door handle sensors", Design Engineering, Group Performance Specifications, May 23, 2018. (English machine translation and German version).

(Continued)

*Primary Examiner* — Khanh C Tran

(57) ABSTRACT

A power line communication system (200) comprising a first node (202) and a second node (204). The first node (202) comprises a second-node-connection-terminal (206); a first-node-transmission-module (208) that provides a first-node-output-signal (210) to the second-node-connection-terminal (206); and modulates the voltage level of the first-node-output-signal based on first-node-transmission-data. The second node (204) comprises a second-node-input-voltage-terminal (214) that is connected to the second-node-connection-terminal (206) of the first node (202) in order to receive the first-node-output-voltage-signal (210). The second node (204) is configured to use the first-node-output-voltage-signal (218) as a supply voltage. The second node (204) also includes a second-node-transmission-module (216) that: provides a second-node-current-signal (218) to the second-node-input-voltage-terminal (214) for transmission to the second-node-connection-terminal (206) of the first node (202); and modulates the current level of the second-node-current-signal (218) based on second-node-transmission-data. The second node (204) also includes a second-node-reception-module (222) that is configured to process the voltage level of the received first-node-output-signal (210) in order to demodulate the first-node-transmission-data. The first node (202) further comprises a first-node-reception-module (226) that processes the current level of the second-node-current-signal (218) received from the second node (204) at the second-node-connection-terminal (206) in order to demodulate the second-node-transmission-data.

20 Claims, 5 Drawing Sheets

(56) References Cited

U.S. PATENT DOCUMENTS

| | | | |
|---|---|---|---|
| 10,230,310 B2* | 3/2019 | Loewenstern | H02S 40/30 |
| 2004/0022304 A1* | 2/2004 | Santhoff | H04B 1/71632 |
| | | | 375/257 |
| 2004/0218688 A1* | 11/2004 | Santhoff | H04B 10/25751 |
| | | | 375/295 |
| 2005/0265526 A1* | 12/2005 | Saeki | H04L 25/0282 |
| | | | 379/90.01 |
| 2007/0206658 A1 | 9/2007 | Park et al. | |
| 2012/0146776 A1* | 6/2012 | Eguchi | H04B 3/548 |
| | | | 340/12.32 |
| 2019/0095378 A1 | 3/2019 | Bareng et al. | |
| 2020/0389469 A1* | 12/2020 | Litichever | H04L 63/029 |

OTHER PUBLICATIONS

Lohaus, L, "Towards Bidirectional Power Line Communication with Digital Load-Side Transmission", 2016 International Symposium on Power Line Communications and its Applications (ISPLC), Mar. 20-23, 2016.

NXP Semiconductors, "High performance rotational speed sensor", Product Data Sheet, Rev. 1, Apr. 29, 2016.

* cited by examiner

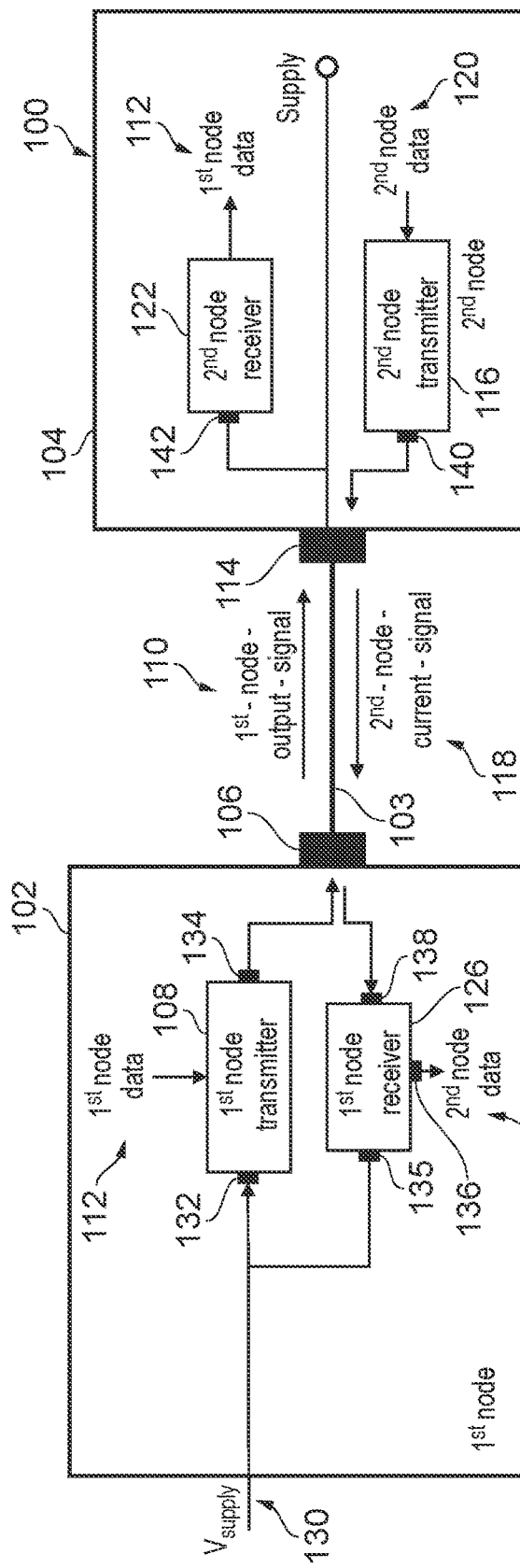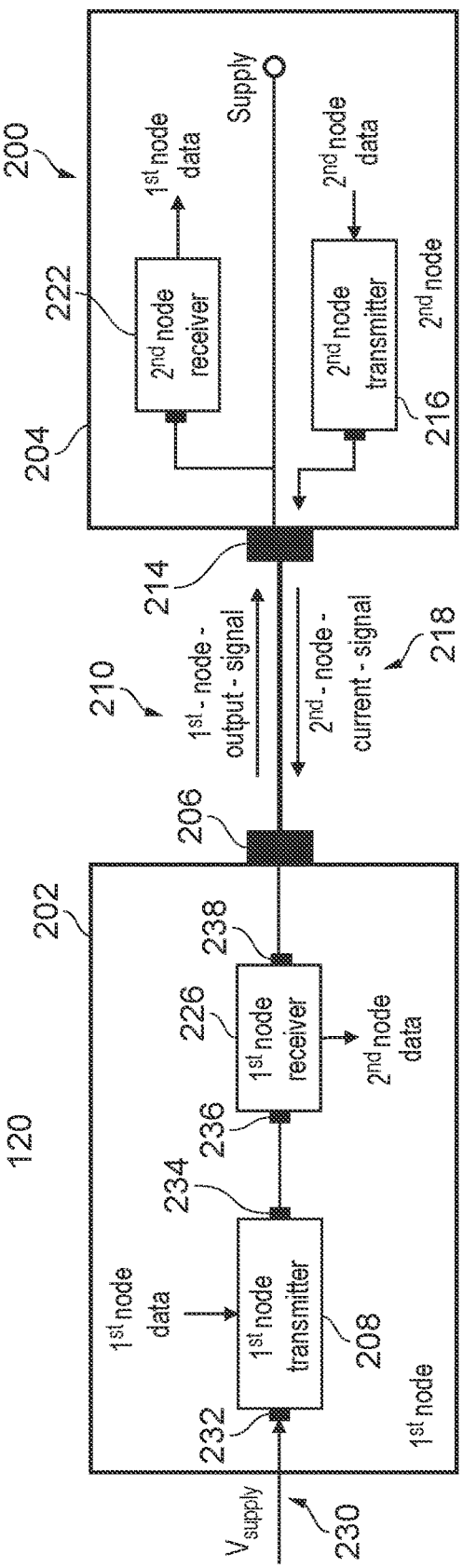

POWER LINE COMMUNICATION SYSTEM

CROSS-REFERENCE TO RELATED APPLICATIONS

This application claims the priority under 35 U.S.C. § 119 of European Patent application no. 21162612.2, filed on Mar. 15, 2021, the contents of which are incorporated by reference herein.

FIELD

The present disclosure relates to a power line communication system.

SUMMARY

According to a first aspect of the present disclosure there is provided a power line communication system comprising:
a first node comprising:
  a second-node-connection-terminal;
  a first-node-transmission-module configured to:
    provide a first-node-output-signal to the second-node-connection-terminal; and
    modulate the voltage level of the first-node-output-signal based on first-node-transmission-data;
a second node, comprising:
  a second-node-input-voltage-terminal that is connected to the second-node-connection-terminal of the first node in order to receive the first-node-output-voltage-signal from the first-node-transmission-module, wherein the second node is configured to use the first-node-output-voltage-signal as a supply voltage;
  a second-node-transmission-module that is configured to:
    provide a second-node-current-signal to the second-node-input-voltage-terminal for transmission to the second-node-connection-terminal of the first node; and
    modulate the current level of the second-node-current-signal based on second-node-transmission-data;
  a second-node-reception-module that is configured to process the voltage level of the received first-node-output-signal in order to demodulate the first-node-transmission-data;
wherein the first node further comprises:
  a first-node-reception-module that is configured to process the current level of the second-node-current-signal received from the second node at the second-node-connection-terminal in order to demodulate the second-node-transmission-data.

Advantageously, the modulated current level of the second-node-current-signal can be communicated from the second node to the first node over the same wire that is used to communicate the first-node-output-signal from the first node to the second node. Therefore, the amount of wiring to implement the communication, and also the provision of a voltage supply to the second node can be reduced when compared with a controller area network (CAN) bus implementation.

In one or more embodiments the first-node-transmission-module comprises:
a first-node-transmission-module-input-terminal configured to receive a supply voltage; and
a first-node-transmission-module-output-terminal configured to provide the first-node-output-signal.

In one or more embodiments the first-node-reception-module comprises:
a first-node-reception-module-input-terminal; and
a first-node-reception-module-output-terminal.

The first-node-transmission-module-output-terminal may be connected to the first-node-reception-module-output-terminal. The first-node-reception-module-input-terminal may be connected to the second-node-connection-terminal. The first-node-reception-module may be configured to provide a connection between the first-node-reception-module-output-terminal and the first-node-reception-module-input-terminal in order to communicate the first-node-output-signal to the second-node-connection-terminal.

In one or more embodiments the first-node-reception-module is configured to selectively provide a connection between the first-node-reception-module-output-terminal and the first-node-reception-module-input-terminal in order to selectively:
  communicate the first-node-output-signal to the second-node-connection-terminal; or
  disconnect the second node from the first-node-transmission-module.

In one or more embodiments the power line communication system further comprises a disconnection-switch that is configured to selectively provide the connection between the first-node-reception-module-output-terminal and the first-node-reception-module-input-terminal.

In one or more embodiments the second-node-connection-terminal of the first node has a wired connection to the second-node-input-voltage-terminal of the second node for communicating the first-node-output-signal and the second-node-current-signal.

In one or more embodiments the first-node-transmission-module is configured to provide the first-node-output-signal to the second-node-connection-terminal simultaneously with the second-node-transmission-module providing the second-node-current-signal to the second-node-input-voltage-terminal for transmission to the second-node-connection-terminal of the first node.

In one or more embodiments the first node comprises:
  one or more additional first-node-reception-modules; and
  one or more second-node-connection-terminals, each of which is associated with a respective one of the one or more additional first-node-reception-modules;

In one or more embodiments the power line communication system further comprises one or more additional second nodes, each of which is associated with a respective one of the one or more second-node-connection-terminals.

Each additional second node may comprise:
  a second-node-input-voltage-terminal that is connected to the associated second-node-connection-terminal of the first node in order to receive the first-node-output-voltage-signal from the first-node-transmission-module, wherein the additional second node is configured to use the first-node-output-voltage-signal as a supply voltage;
  a second-node-transmission-module that is configured to:
    provide a second-node-current-signal to the second-node-input-voltage-terminal of the additional second node for transmission to the associated second-node-connection-terminal of the first node; and
    modulate the current level of the second-node-current-signal based on second-node-transmission-data associated with the additional second node; and a second-node-reception-module that is configured to process the voltage level of the received first-node-output-signal in order to demodulate the first-node-transmission-data.

Each additional first-node-reception-module may be configured to process the current level of the second-node-current-signal received from the associated additional second node in order to demodulate the second-node-transmission-data associated with the additional second node.

In one or more embodiments the second-node-transmission-module comprises:
a variable current source that is connected between a reference terminal and the second-node-input-voltage-terminal, and wherein the second node is configured to modulate the current level of the variable current source based on the second-node-transmission-data.

In one or more embodiments the second-node-transmission-module further comprises:
a capacitor connected between the reference terminal and the second-node-input-voltage-terminal.

In one or more embodiments the first-node-transmission-module comprises:
a variable current source that is connected between a reference terminal and the second-node-connection-terminal;
a transmission-switch, which is connected in series between a first-node-transmission-module-input-terminal and the second-node-connection-terminal;
a resistor that is connected in parallel with the transmission-switch, such that it is also connected in series between the first-node-transmission-module-input-terminal and the second-node-connection-terminal.

The first node may be configured to modulate the current level of the variable current source based on the first-node-transmission-data. The first node may be configured to close the transmission-switch when the first-node-transmission-module transmitting.

In one or more embodiments the first-node-transmission-module further comprises:
a capacitor that is connected between the reference terminal and the second-node-connection-terminal.

There is also provided an automobile access system comprising any system disclosed herein.

In one or more embodiments the second node comprises an ultra-wideband anchor.

There is also provided a method of operating a power line communication system, wherein the power line communication system comprises a first node and a second node, and wherein the method comprises:
the first node:
providing a first-node-output-signal to a second-node-connection-terminal of the first node; and
modulating the voltage level of the first-node-output-signal based on first-node-transmission-data;
the second node:
receiving the first-node-output-voltage-signal from the first node at a second-node-input-voltage-terminal of the second node, and using the first-node-output-voltage-signal as a supply voltage for the second node;
providing a second-node-current-signal to the second-node-input-voltage-terminal for transmission to the second-node-connection-terminal of the first node; and
modulating the current level of the second-node-current-signal based on second-node-transmission-data;

processing the voltage level of the received first-node-output-signal in order to demodulate the first-node-transmission-data;
the first node:
processing the current level of the second-node-current-signal received from the second node at the second-node-connection-terminal in order to demodulate the second-node-transmission-data.

In one or more embodiments the power line communication system further comprises one or additional second nodes, and wherein the first node comprises one or more additional second-node-connection-terminals each of which is associated with a respective one of the one or more additional second nodes, and wherein the method comprises:
each additional second node:
receiving the first-node-output-voltage-signal from the first node at a second-node-input-voltage-terminal of the additional second node, and using the first-node-output-voltage-signal as a supply voltage for the additional second node;
providing a second-node-current-signal to the second-node-input-voltage-terminal for transmission to the associated second-node-connection-terminal of the first node;
modulating the current level of the second-node-current-signal based on second-node-transmission-data; and
processing the voltage level of the received first-node-output-signal in order to demodulate the first-node-transmission-data; and
the first node:
processing the current level of the second-node-current-signal received from each of the one or more additional second nodes at the associated additional second-node-connection-terminal in order to demodulate the second-node-transmission-data from each additional second node.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:
FIG. 1 shows an example embodiment of a power line communication system;
FIG. 2 shows another example embodiment of a power line communication system.

DETAILED DESCRIPTION

Figure 3:
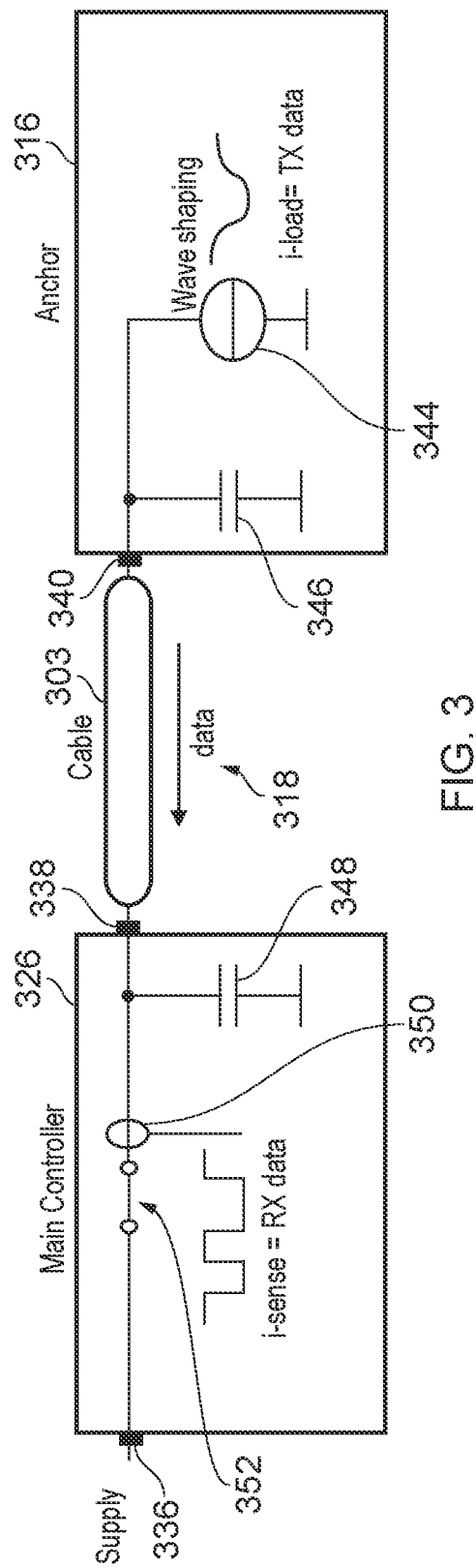
FIG. 3 shows an example embodiment of a first-node-reception-module and a second-node-transmission-module.

A controller area network (CAN) bus can be used to connect multiple ultra-wideband (UWB) anchors in a car. Such UWB anchors can be used to determine the position of a user's key in relation to the car as part of a car access feature. This CAN bus can be a dedicated (private) bus for the UWB enabled car access feature. A minimum of 4 UWB anchors can be connected on this bus to a so-called UWB ranging master electronic control unit (ECU) which can also be the gateway into the CAN bus of the whole vehicle. The topology has an advantage that it can be built with components that are readily available. Furthermore, the CAN bus is a proven system. However, such a system has high current consumption, is expensive to implement and can have downsides with synchronization capabilities.

Looking at the average current consumption of such a system. all UWB anchors (minimum of 4) are permanently supplied and the current consumption can be up to 100 µA (so greater than 400 µA for the full system). Various applications, especially in the automotive industry, require an average current consumption of the entire system of less than 2 mA. For instance, the automotive industry has become accustomed to such low current consumption from the legacy low frequency (LF) based car access systems. Therefore, with this CAN architecture at least 20% of the total current consumption is used by the CAN system for communicating with the UWB anchors. Furthermore, in some high-end vehicles, there can be 8 UWB anchors, in which case so greater than 800 µA (greater than 40%) is used by the CAN bus for the UWB ranging system. However, the UWB system is not doing anything besides drawing current when the car is parked and waiting on BLE (Bluetooth low energy) for a paired phone showing up in proximity of the vehicle.

Looking at the cost of implementing such a CAN system, there is a significant wiring effort and cost for this private CAN bus because at least 3 to 4 wires are need for each UWB anchor (Supply/CAN_H/CAN_L/(GND*)).

Looking at synchronisation, for current systems the protocol synchronization happens via the air interface (UWB). It is likely that not all of the UWB anchors will communicate with the UWB ranging master, for instance because not all of the UWB anchors will sense a UWB signal when the key (which may be a phone) initiates a ranging session. In a worst case scenario, it could be that none of the UWB anchors of the car sense a UWB signal. As a consequence, these UWB anchors stay active for a long time continuous waiting to receive a UWB signal such that they dissipate a lot of power. In turn, this can also be a challenge from the thermal management of such an ECU because they should be very small in terms of the space they occupy on a printed circuit board (PCB).

FIG. 1 shows an example embodiment of a power line communication system 100. The system includes a first node 102 and a second node 104. The first node 102 can be a master node, such as a ranging master for use in a UWB ranging system in an automobile. The second node 104 can be one of a plurality of UWB anchors.

The first node 102 is in wired communication with the second node 102 over a cable/wire 103. The first node 102 includes a second-node-connection-terminal 106. The second node 104 includes a second-node-input-voltage-terminal 114. The wire 103 is connected between the second-node-connection-terminal 106 and the second-node-input-voltage-terminal 114. As will be described below, the wire 103 is used to provide a supply voltage to the second node 104. The wire 103 is also to provide bi-directional communication between the first node 102 and the second node 104. For this reason, the system of FIG. 1 can be considered as providing bi-directional power line communication. In some examples, the system 100 of FIG. 1 can be part of an in-vehicle UWB system. One or more of the examples described herein can improve/optimize overall system performance parameters such as average current consumption, cost and receiver synchronization of multiple UWB anchors. Furthermore, electromagnetic interference (EMI) emission limits that can apply in automotive applications can also be satisfied.

The first node 102 includes a first-node-transmission-module 108 and a first-node-reception-module 126. The second node 104 includes a second-node-transmission-module 116 and a second-node-reception-module 122. The first-node-transmission-module 108 is for modulating and transmitting first-node-transmission-data 112 to the second-node-reception-module 122 of the second node. The second-node-transmission-module 116 is for modulating and transmitting second-node-transmission-data 120 to the first-node-reception-module 126 of the first node 102.

More particularly, the first-node-transmission-module 108 of the first node 102 provides a first-node-output-signal 110 to the second-node-connection-terminal 106, and it modulates the voltage level of the first-node-output-signal 110 based on the first-node-transmission-data 112. This modulation can be amplitude modulation such that a delta can be applied to the voltage level of the first-node-output-signal 110 in order to communicate the first-node-transmission-data 112.

The second-node-input-voltage-terminal 114 of the second node 104 is connected to the second-node-connection-terminal 106 of the first node 102 (by the wire 103 in this example) in order to receive the first-node-output-voltage-signal 110 from the first-node-transmission-module 108. The second node 104 uses the first-node-output-voltage-signal 110 as a supply voltage for the second node 104. Therefore, it will be appreciated that the modulation of the first-node-transmission-data 112 should be in such a way that the first-node-output-voltage-signal 110 can still be used as stable supply voltage for the second node 104. In examples where amplitude modulation is used by the first-node-transmission-module 108, the size of any delta that is applied to the voltage level of the first-node-output-signal 110 should be sufficiently small such that it does not affect the stability of the voltage supply at the second node 104. Furthermore, there can also be a trade-off between the accuracy with which the modulated data can be demodulated and EMI that will result from changing the voltage level of the first-node-output-signal 110.

The second-node-reception-module 122 of the second node 104 processes the voltage level of the received first-node-output-signal 110 in order to demodulate the first-node-transmission-data 112. An example of how the firstnode-transmission-data 112 can be modulated on, and demodulated from, the first-node-output-signal 110 will be described below.

The second-node-transmission-module 116 of the second node provides a second-node-current-signal 118 to the second-node-input-voltage-terminal 114 for transmission to the second-node-connection-terminal 106 of the first node 102. The second-node-transmission-module 116 modulates the current level of the second-node-current-signal 118 based on the second-node-transmission-data 120. The first-node-reception-module 126 of the first node 102 processes the current level of the second-node-current-signal 118 received from the second node 104 at the second-node-connection-terminal 106 in order to demodulate the second-node-transmission-data 120.

Advantageously, the modulated current level of the second-node-current-signal 118 can be communicated from the second node 104 to the first node 102 over the same wire 103 that is used to communicate the first-node-output-signal 110 from the first node 102 to the second node 104. Further still, as will be discussed below, the system 100 of FIG. 1 can provide for full duplex communication between the first node 102 and the second node 104. That is, the first node 102 can communicate the first-node-transmission-data 112 to the second node 104 simultaneously with the second node 104 communicating the second-node-transmission-data 120 to the first node 102. Alternatively, time division multiplexing can be used such that the first node 102 communicates the first-node-transmission-data 112 to the second node 104 at a different to that at which the second node 104 communicates the second-node-transmission-data 120 to the first node 102.

In this example, the first-node-transmission-module 108 includes a first-node-transmission-module-input-terminal 132 that receives a supply voltage $V_{SUPPLY}$ 130. In automotive applications, the supply voltage $V_{SUPPLY}$ 130 can be provided by a battery. Therefore, power consumption can be a very important consideration. The first-node-transmission-module 108 also includes a first-node-transmission-module-output-terminal 134 that provides the first-node-output-signal 110.

The first-node-reception-module 126 includes a first-node-reception-module-input-terminal 138 that receives the second-node-current-signal 118 from the second node 104. The first-node-reception-module 126 also includes a first-node-reception-module-output-terminal 136 that provides the demodulated second-node-transmission-data 120. In this example, the first-node-reception-module 126 also includes a first-node-reception-module-supply-terminal 135 that receives the supply voltage $V_{SUPPLY}$ 130. As will be appreciated from FIG. 2, the first-node-reception-module-output-terminal 136 and the first-node-reception-module-supply-terminal 135 can be the same terminal in some examples.

In this example, the first-node-transmission-module-output-terminal 134 is connected directly to the second-node-connection-terminal 106, and the first-node-reception-module-input-terminal 138 is also connected directly to the second-node-connection-terminal 106. In this way, the first-node-transmission-module 108 can be considered as being in parallel with the first-node-reception-module 126. In an alternative embodiment, as will be described below, the first-node-transmission-module 108 and the first-node-reception-module 126 can be provided in series with each other. Irrespective of the implementation, the first-node-transmission-module 108 provides the first-node-output-signal 110 to the second-node-connection-terminal 106, and the first-node-reception-module 126 receives the second-node-current-signal 118 from the second-node-connection-terminal 106.

The second-node-reception-module 122 includes a second-node-reception-module-input-terminal 142, which is connected to the second-node-input-voltage-terminal 114 such that it receives the first-node-output-signal 110 from the first node 102. The second-node-transmission-module 116 includes a second-node-transmission-module-output-terminal 140 that is also connected to the second-node-input-voltage-terminal 114 such that it can provide the second-node-current-signal 118 to the first node 102.

FIG. 2 shows another example embodiment of a power line communication system 200. Features of FIG. 2 that are common to FIG. 1 will be given corresponding reference numbers in the 200 series, and will not necessarily be described in detail again here. In FIG. 2, the first-node-transmission-module 208 and the first-node-reception-module 226 are provided in series with each other. The second node 204 in FIG. 2 is implemented in the same way as the second node in FIG. 1.

In FIG. 2, the first-node-transmission-module 208 has a first-node-transmission-module-input-terminal 232 and a first-node-transmission-module-output-terminal 234. The first-node-reception-module 226 has a first-node-reception-module-input-terminal 238 and a first-node-reception-module-output-terminal 236. The first-node-transmission-module-input-terminal 232 receives a supply voltage $V_{SUPPLY}$ 230. The first-node-transmission-module-output-terminal 234 is connected to the first-node-reception-module-output-terminal 236. The first-node-reception-module-input-terminal 238 is connected to the second-node-connection-terminal 206. In this way, the first-node-transmission-module 208 provides the first-node-output-signal 210 to the second-node-connection-terminal 206 via the first-node-reception-module 226. That is, the first-node-reception-module 226 can provide a connection (in some examples a direct connection) between the first-node-reception-module-output-terminal 236 and the first-node-reception-module-input-terminal 238 in order to communicate the first-node-output-signal 210 to the second-node-connection-terminal 206.

FIG. 3 shows an example embodiment of a first-node-reception-module 326 and a second-node-transmission-module 316, that can communicate with each other over a cable 303. More particularly, the second-node-transmission-module 316 can send a second-node-current-signal 318 to the first-node-reception-module 326 over the cable 303.

The second-node-transmission-module 316 in this example includes a variable current source 344 that is connected between a reference terminal and the second-node-transmission-module-output-terminal 340 of the second-node-transmission-module 316. As shown schematically in FIG. 3, the second node modulates the current level (i-load) of the variable current source 344 based on second-node-transmission-data (TX data) using wave shaping. Any known suitable wave shaping algorithm can be used to reduce the EMI effects of the modulation. For example, modulating the second-node-transmission-data with a square wave function may generate harmonics that would be unacceptable in an automotive environment. The achievable limits on the EME (electromagnetic environment) can define the maximum data rate that can be used to communicate the second-node-transmission-data.

The second-node-transmission-module 316 also includes a capacitor 346 that is connected between the reference terminal and the second-node-transmission-module-output-terminal 340. The capacitor 346 can smooth the secondnode-current-signal 318, and it can also be useful for electrostatic discharge (ESD) protection.

The first-node-reception-module 326 includes a current-sense (i-sense) circuit that can sense the level of the current of the second-node-current-signal 318 that is received at the first-node-reception-module-input-terminal 338. The implementation of the i-sense circuit can, for example, include either: a current copy circuit with some current mirrors; or a shunt resistor with a differential amplifier. In FIG. 3 the first-node-reception-module 326 includes a current copy circuit 350. As shown schematically in FIG. 3, the first-node-reception-module 326 demodulates the second-node-transmission-data (RX data) from the sensed current level of the second-node-current-signal 318. In this implementation, the first-node-reception-module 326 also includes a capacitor 348 that is connected between the first-node-reception-module-input-terminal 338 and a reference terminal. The capacitor 348 can also provide smoothing and be useful for electrostatic discharge (ESD) protection.

The first-node-reception-module 326 of FIG. 3 can be connected in series with a first-node-transmission-module (not shown), such that its first-node-reception-module-output-terminal 336 receives a supply voltage. This supply voltage may be a modulated supply voltage, implemented as a first-node-output-signal, if the first node is transmitting.

In this example, the first-node-reception-module 326 also includes a disconnection-switch 352 that is configured to selectively connect or disconnect the first-node-reception-module-output-terminal 336 to or from the first-node-reception-module-input-terminal 338. When the disconnection-switch 352 is open/non-conductive, the first-node-reception-module-output-terminal 336 is disconnected from the first-node-reception-module-input-terminal 338. In examples where the first-node-reception-module 326 of FIG. 3 is connected in series with a first-node-transmission-module (as shown in FIG. 2), opening the disconnection-switch 352 causes the second node to be disconnected from the first node. This can be advantageous for isolating the second node, which can be referred to as muting an anchor in examples where the second node is a UWB anchor. In this way, a switch is provided for the individual second node such that fail-safe functionality is available and the entire system is not disabled if there is a problem at the second node. Such a problem in an automotive application can be a short on a supply harness at the UWB anchor. Furthermore, the ability to disconnect an anchor/second node when it is not needed can be useful for reducing power consumption. As indicated above, a UWB anchor can draw 100 μA when it is supplied but in low power mode. Therefore, the current drawn by the UWB anchor can be reduced to 0 μA when the UWB anchor is disconnected from the supply.

It has been found by simulating operation of the circuit of FIG. 3, and by plotting the emissions versus frequency, that the emissions are within the acceptable EME limits for an automotive application. The implementation of the current source and wave shaping can be optimized to reduce emissions further if required.

Figure 4:
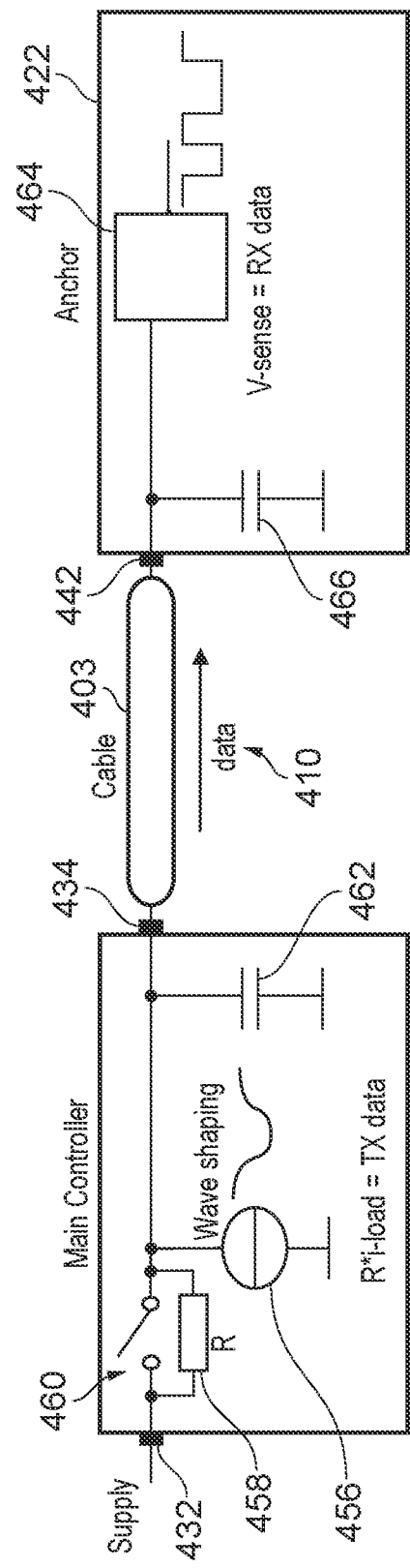
FIG. 4 shows an example embodiment of a first-node-reception-module and a second-node-transmission-module.

FIG. 4 shows an example embodiment of a first-node-transmission-module 408 and a second-node-reception-module 422, that can communicate with each other over a cable 403. More particularly, the first-node-transmission-module 408 can send a first-node-output-signal 410 to the second-node-reception-module 422 over the cable 403.

The first-node-transmission-module 408 in this example includes a variable current source 456 that is connected between a reference terminal and the first-node-transmission-module-output-terminal 434 of the first-node-transmission-module 408. The first-node-transmission-module 408 also includes a resistor 458 and a transmission-switch 460. The transmission-switch 460 is connected in series between the first-node-transmission-module-input-terminal 432 and the first-node-transmission-module-output-terminal 434. The resistor 458 is connected in parallel with the transmission-switch 460, such that it is also connected in series between the first-node-transmission-module-input-terminal 432 and the first-node-transmission-module-output-terminal 434. In this way: when the transmission-switch 460 is closed/conducting, it shorts the resistor 458; and when the transmission-switch 460 is open/non-conducting, the resistor 458 is connected in series between the first-node-transmission-module-input-terminal 432 and the first-node-transmission-module-output-terminal 434.

As shown schematically in FIG. 4, when the first-node-transmission-module 408 is transmitting: (i) the transmission-switch 460 is open/non-conducting; and (ii) the first node modulates the current level (i-load) of the variable current source 456 based on first-node-transmission-data (TX data) using wave shaping. Any known suitable wave shaping algorithm can be used to reduce the EMI effects of the modulation. The transmission-switch 460 is open such that the current provided by the variable current source 456 flows through the resistor 458 and therefore the current causes an additional or a reduced voltage drop across the resistor 458. In this way, the first-node-transmission-module 408 modulates the voltage level of the first-node-output-signal 410 based on the first-node-transmission-data (TX data). As indicated in FIG. 4, the voltage modulation is defined as R*i-load. That is, the product of the resistance (R) of the resistor 458 and the current level (i-load) of the variable current source 456.

The transmission-switch 460 is this example should thus be open/non-conducting whenever the first node is transmitting. It may not matter whether the transmission-switch 460 is open or closed when the second node is transmitting.

The first-node-transmission-module 408 also includes a capacitor 462 that is connected between the reference terminal and the first-node-transmission-module-output-terminal 434.

The second-node-reception-module 422 includes a voltage-sense (V-sense) circuit 464 that can sense the level of the voltage of the first-node-output-signal 410 that is received at the second-node-reception-module-input-terminal 442. The implementation of the V-sense circuit 464 can, for example, include a simple comparator solution or an ADC (analogue to digital converter) with appropriate post-processing, as is well-known in the art. As shown schematically in FIG. 4, the second-node-reception-module 422 demodulates the first-node-transmission-data (RX data) from the sensed voltage level of the first-node-output-signal 410. In this implementation, the second-node-reception-module 422 also includes a capacitor 466 that is connected between the second-node-reception-module-input-terminal 442 and a reference terminal.

The capacitors 462, 466 that are shown in FIG. 4 can provide smoothing and also be useful for electrostatic discharge (ESD) protection.

It has been found by simulating operation of the circuit of FIG. 4, and by plotting the of emissions versus frequency, that the emissions are within the acceptable EME limits for an automotive application. Furthermore, the implementation of the circuit can be optimized to either decrease the EME or increase data rate if required.

Figure 5:
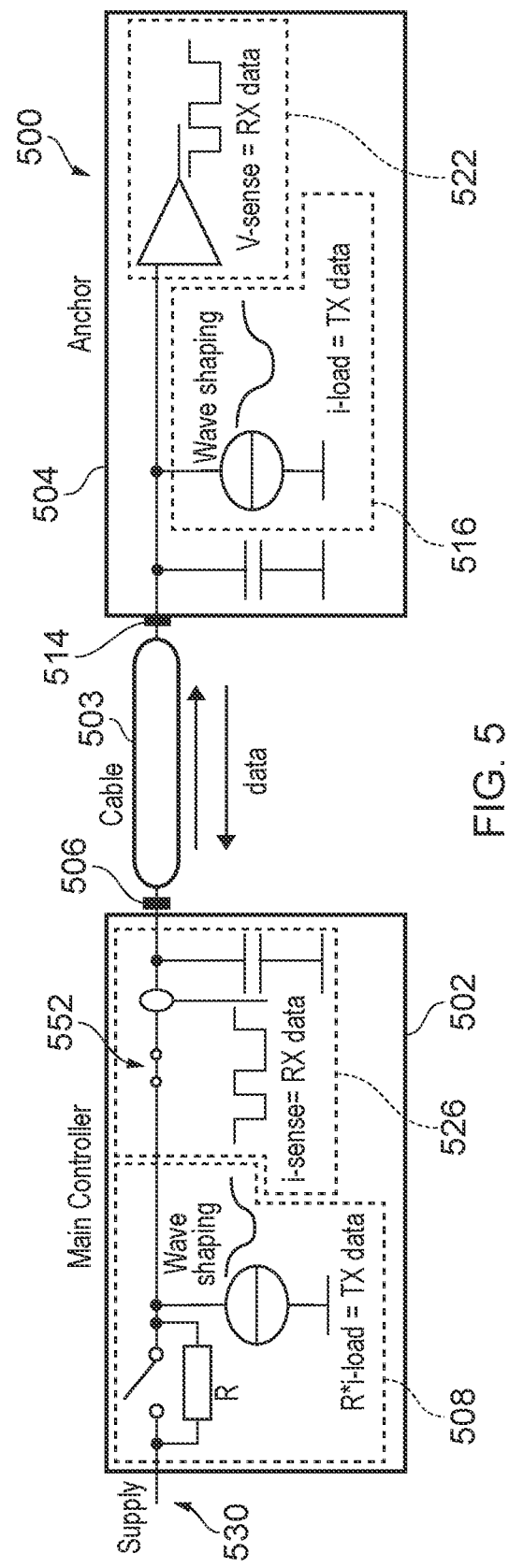
FIG. 5 shows an example embodiment of a power line communication system, which includes a first node and a second node.

FIG. 5 shows an example embodiment of a power line communication system 500, which includes a first node 502 and a second node 504 that are connected together by a wire 503. As can be seen from FIG. 5, the second-node-connection-terminal 506 of the first node 502 has a wired connection 503 to the second-node-input-voltage-terminal 514 for communicating the first-node-output-signal and the second-node-current-signal.

The system 500 of FIG. 5 corresponds to the system of FIG. 2, with further details of the example implementations of FIGS. 3 and 4 included.

More particularly, the first node 502 has a first-node-transmission-module 508 and a first-node-reception-module 526 connected in series between a voltage supply 530 and a second-node-connection-terminal 506. The second node 504 has a second-node-transmission-module 516 and a second-node-reception-module 522 that are both connected to a second-node-input-voltage-terminal 514.

The first-node-reception-module 526 includes a disconnection-switch 552, which is connected in the same way as the corresponding component of FIG. 3. In this way, the first-node-reception-module 526 can selectively provide, using the disconnection-switch 552, a connection between the first-node-reception-module-output-terminal 536 and the first-node-reception-module-input-terminal 538 in order to selectively:

communicate the first-node-output-signal 510 from the first-node-transmission-module 508 to the second-node-connection-terminal 506; or disconnect the second node 504 from the first-node-transmission-module 508.

Figure 6:
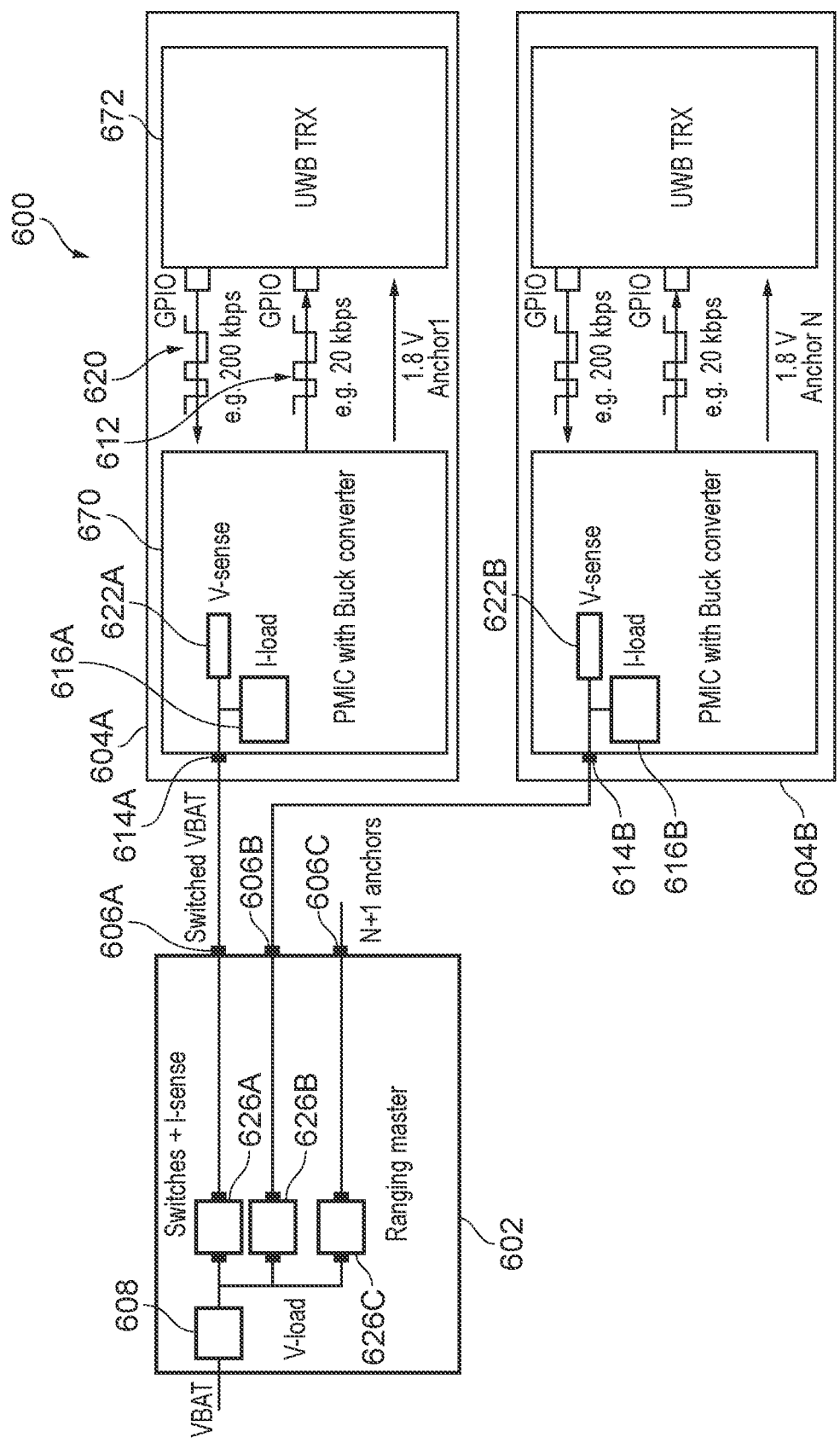
FIG. 6 shows an example power line communication system that includes a first node and a plurality of second nodes.

FIG. 6 shows an example power line communication system 600 that includes a first node 602 and a plurality of second nodes 604A, 604B. The system 600 of FIG. 6 is for an automotive application, whereby the first node 602 is a ranging master and the second nodes 604A-B are UWB anchors. The plurality of second nodes can be identified as a second node 604A and one or more additional second nodes 604B (only one additional second node 604B is shown in FIG. 6, although it will be appreciated that there could be any number of additional second nodes).

The first node 602 includes a first-node-transmission-module 608 and a plurality of first-node-reception-modules 626A-C. The plurality of first-node-reception-modules can be identified as a first-node-reception-modules 626A and one or more additional first-node-reception-modules 626B-C (two additional first-node-reception-modules 626A-B is shown in FIG. 6, although it will be appreciated that there could be any number of additional first-node-reception-modules, with each additional first-node-reception-module corresponding to an additional second node 604B).

The first node 602 also has one or more second-node-connection-terminals 606B-C, each of which is associated with a respective one of the one or more additional first-node-reception-modules 626B-C. These second-node-connection-terminals 606B-C can also be referred to as additional second-node-connection-terminals 606B-C. Each of the one or more additional second nodes 604B is associated with a respective one of the one or more second-node-connection-terminals 606B-C.

Each additional second node 604B includes a second-node-input-voltage-terminal 614B that is connected to the associated second-node-connection-terminal 606B of the first node 602 in order to receive a first-node-output-voltage-signal (Switched VBAT in FIG. 6) from the first-node-transmission-module 608.

The additional second node 604B is configured to use the first-node-output-voltage-signal (Switched VBAT) as a supply voltage in the same way that is described above. The additional second node 604B includes a second-node-transmission-module 616B provides a second-node-current-signal to the second-node-input-voltage-terminal 614B of the additional second node 604B for transmission to the associated second-node-connection-terminal 606B of the first node 602. In the same way as described above, the second-node-transmission-module 616B modulates the current level of the second-node-current-signal based on second-node-transmission-data associated with the additional second node 604B.

In addition, the additional second node 604B includes a second-node-reception-module 622B that processes the voltage level of the received first-node-output-signal in order to demodulate the first-node-transmission-data. Each additional first-node-reception-module 626B is configured to process the current level of the second-node-current-signal received from the associated additional second node 604B in order to demodulate the second-node-transmission-data associated with the additional second node 604B.

It will therefore be appreciated that the first-node-transmission-module 608 is for transmitting the same first-node-output-signal to each of the second nodes 604A-B. Whereas in this example the plurality of first-node-reception-modules 626A-C are for receiving a second-node-current-signal from an associated one of the plurality of second nodes 604A-B.

In the example of FIG. 6, each second node 604A-B includes a power management integrated circuit (PMIC) 670. The PMIC 670 includes a buck converter, and also the second-node-reception-module 622A and the second-node-transmission-module 616A that are described above. Each second node 604A-B also includes a UWB transceiver (UWB TRX) 672. The PMIC 670 provides the voltage supply for the UWB TRX 672 using the first-node-output-voltage-signal (Switched VBAT) from the first-node-transmission-module 608.

The PMIC 670 also provides the demodulated first-node-transmission-data 612 to the UWB TRX 672, and receives the second-node-transmission-data 620 from the UWB TRX 672 for modulating and transmitting to the first node 602.

The first node 602 (ranging master) can be connected on one side to a car battery, and can supply on the other side all second nodes 604A-B (anchors) with a switch battery supply. The number of second nodes 604A-B (anchor devices) defines the number of switches in the first node 602 (ranging master) that are used to distribute the battery supply. In addition to these switches, the first node 602 (ranging master) includes first-node-reception-modules (current sense circuits) to detect the load modulation of the associated second nodes 604A-B (anchors) and a first-node-transmission-module 608 (voltage load circuit) to modulate the supply to talk to the second node 604A-B (anchor).

Each of the second nodes 604A-B (anchors) includes a second-node-transmission-module 616A-B (current load circuit) for load modulation and a second-node-reception-module 622A-B (voltage sense circuit) to detect the voltage modulation applied by the first node 602 (ranging master).

One or more of the examples disclosed herein can provide:

a switchable battery supply from a ranging master device to all individual anchors (point to point connection) to turn them off when not needed (save current/100 µA per anchor).

bidirectional power line circuits at the master and anchor side that allow data communication from anchors to master and vice versa. Each side can receive data load modulation and modulate data on the supply line.

load-modulation-based drive levels and data rate for the power line communication optimized to meet EMC limits in the automotive industry (which can correspond to today's Car OEM LIN limits).

synchronisation of RX activation to a global time agreed by BLE and a phone that is used as a key to gain access to a vehicle.

full duplex communication because of voltage based master TX and current based anchor TX.

Beneficially, examples of the present disclosure can provide for bi-directional load modulation based power line communication with drive schemes that can fulfil EME requirements and also enable a low current and low cost UWB system in a car.

Figure 7:
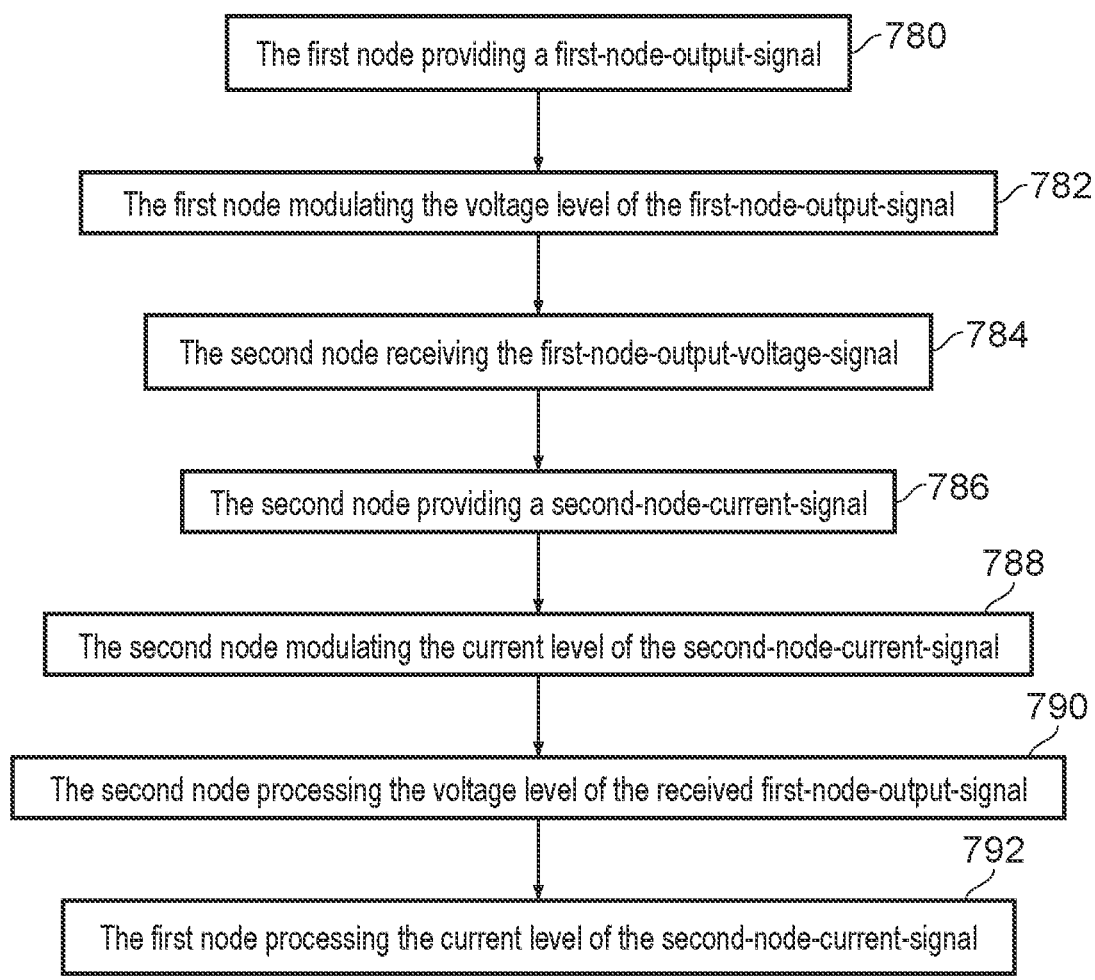
FIG. 7 illustrates schematically a method of operating a power line communication system.

FIG. 7 illustrates schematically a method of operating a power line communication system. As described in detail above, the power line communication system includes a first node and at least one second node.

At steps 780 and 782, the method involves the first node:
providing a first-node-output-signal to a second-node-connection-terminal of the first node; and
modulating the voltage level of the first-node-output-signal based on first-node-transmission-data.

At steps 784, 786, 788 and 790, the method involves the second node:
receiving the first-node-output-voltage-signal from the first node at a second-node-input-voltage-terminal of the second node, and using the first-node-output-voltage-signal as a supply voltage for the second node;
providing a second-node-current-signal to the second-node-input-voltage-terminal for transmission to the second-node-connection-terminal of the first node; and
modulating the current level of the second-node-current-signal based on second-node-transmission-data; and
processing the voltage level of the received first-node-output-signal in order to demodulate the first-node-transmission-data.

At step 792, the method involves the first node: processing the current level of the second-node-current-signal received from the second node at the second-node-connection-terminal in order to demodulate the second-node-transmission-data.

It will be appreciated that the method steps shown in FIG. 7 do not need to be performed in the order shown. One or more of the steps may be performed simultaneously, for example to provide full-duplex functionality. Also, if the system is not operating in full-duplex mode, the skilled person will appreciate that it does not matter which of the first node and the second node modulates and transmits data to the other node first. That is, the voltage-based communication and the current-based communication can be performed in any order sequentially or can be performed simultaneously.

It will be appreciated that one or more steps of the method of FIG. 7 may be excluded, or performed in a different order, depending upon which of the first node and the second node have data to transmit to the other node.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A power line communication system comprising:
a first node comprising:
a second-node-connection-terminal;
a first-node-transmission-module configured to:
provide a first-node-output-signal to the second-node-connection-terminal; and
modulate the voltage level of the first-node-output-signal based on first-node-transmission-data;
a second node, comprising:
a second-node-input-voltage-terminal that is connected to the second-node-connection-terminal of the first node in order to receive the first-node-output-voltage-signal from the first-node-transmission-module, wherein the second node is configured to use the first-node-output-voltage-signal as a supply voltage;

a second-node-transmission-module that is configured to:
provide a second-node-current-signal to the second-node-input-voltage-terminal for transmission to the second-node-connection-terminal of the first node; and
modulate the current level of the second-node-current-signal based on second-node-transmission-data;
a second-node-reception-module that is configured to process the voltage level of the received first-node-output-signal in order to demodulate the first-node-transmission-data;
wherein the first node further comprises:
a first-node-reception-module that is configured to process the current level of the second-node-current-signal received from the second node at the second-node-connection-terminal in order to demodulate the second-node-transmission-data.

2. The power line communication system of claim 1, wherein:
the first-node-transmission-module comprises:
a first-node-transmission-module-input-terminal configured to receive a supply voltage; and
a first-node-transmission-module-output-terminal configured to provide the first-node-output-signal;
the first-node-reception-module comprises:
a first-node-reception-module-input-terminal; and
a first-node-reception-module-output-terminal;
the first-node-transmission-module-output-terminal is connected to the first-node-reception-module-output-terminal; and
the first-node-reception-module-input-terminal is connected to the second-node-connection-terminal; and
the first-node-reception-module is configured to provide a connection between the first-node-reception-module-output-terminal and the first-node-reception-module-input-terminal in order to communicate the first-node-output-signal to the second-node-connection-terminal.

3. The power line communication system of claim 2, wherein the first-node-reception-module is configured to selectively provide a connection between the first-node-reception-module-output-terminal and the first-node-reception-module-input-terminal in order to selectively:
communicate the first-node-output-signal to the second-node-connection-terminal; or
disconnect the second node from the first-node-transmission-module.

4. The power line communication system of claim 3, further comprising a disconnection-switch that is configured to selectively provide the connection between the first-node-reception-module-output-terminal and the first-node-reception-module-input-terminal.

5. The power line communication system of claim 2, wherein the second-node-connection-terminal of the first node has a wired connection to the second-node-input-voltage-terminal of the second node for communicating the first-node-output-signal and the second-node-current-signal.

6. The power line communication system of claim 2, wherein the first-node-transmission-module is configured to provide the first-node-output-signal to the second-node-connection-terminal simultaneously with the second-node-transmission-module providing the second-node-current-signal to the second-node-input-voltage-terminal for transmission to the second-node-connection-terminal of the first node.

7. The power line communication system of claim 2, wherein:
the first node comprises:
one or more additional first-node-reception-modules; and
one or more second-node-connection-terminals, each of which is associated with a respective one of the one or more additional first-node-reception-modules;
further comprising one or more additional second nodes, each of which is associated with a respective one of the one or more second-node-connection-terminals;
wherein:
each additional second node comprises:
a second-node-input-voltage-terminal that is connected to the associated second-node-connection-terminal of the first node in order to receive the first-node-output-voltage-signal from the first-node-transmission-module, wherein the additional second node is configured to use the first-node-output-voltage-signal as a supply voltage;
a second-node-transmission-module that is configured to:
provide a second-node-current-signal to the second-node-input-voltage-terminal of the additional second node for transmission to the associated second-node-connection-terminal of the first node; and
modulate the current level of the second-node-current-signal based on second-node-transmission-data associated with the additional second node; and
a second-node-reception-module that is configured to process the voltage level of the received first-node-output-signal in order to demodulate the first-node-transmission-data;
each additional first-node-reception-module is configured to process the current level of the second-node-current-signal received from the associated additional second node in order to demodulate the second-node-transmission-data associated with the additional second node.

8. The power line communication system of claim 2, wherein the second-node-transmission-module comprises:
a variable current source that is connected between a reference terminal and the second-node-input-voltage-terminal, and wherein the second node is configured to modulate the current level of the variable current source based on the second-node-transmission-data.

9. The power line communication system of claim 2, wherein the first-node-transmission-module comprises:
a variable current source that is connected between a reference terminal and the second-node-connection-terminal;
a transmission-switch, which is connected in series between a first-node-transmission-module-input-terminal and the second-node-connection-terminal;
a resistor that is connected in parallel with the transmission-switch, such that it is also connected in series between the first-node-transmission-module-input-terminal and the second-node-connection-terminal;
wherein the first node is configured to modulate the current level of the variable current source based on the first-node-transmission-data; and
wherein the first node is configured to close the transmission-switch when the first-node-transmission-module is transmitting.

10. The power line communication system of claim 1, wherein the second-node-connection-terminal of the first node has a wired connection to the second-node-input-voltage-terminal of the second node for communicating the first-node-output-signal and the second-node-current-signal.

11. The power line communication system of claim 1, wherein the first-node-transmission-module is configured to provide the first-node-output-signal to the second-node-connection-terminal simultaneously with the second-node-transmission-module providing the second-node-current-signal to the second-node-input-voltage-terminal for transmission to the second-node-connection-terminal of the first node.

12. The power line communication system of claim 1, wherein:
the first node comprises:
one or more additional first-node-reception-modules; and
one or more second-node-connection-terminals, each of which is associated with a respective one of the one or more additional first-node-reception-modules;
further comprising one or more additional second nodes, each of which is associated with a respective one of the one or more second-node-connection-terminals;
wherein:
each additional second node comprises:
a second-node-input-voltage-terminal that is connected to the associated second-node-connection-terminal of the first node in order to receive the first-node-output-voltage-signal from the first-node-transmission-module, wherein the additional second node is configured to use the first-node-output-voltage-signal as a supply voltage;
a second-node-transmission-module that is configured to:
provide a second-node-current-signal to the second-node-input-voltage-terminal of the additional second node for transmission to the associated second-node-connection-terminal of the first node; and
modulate the current level of the second-node-current-signal based on second-node-transmission-data associated with the additional second node; and
a second-node-reception-module that is configured to process the voltage level of the received first-node-output-signal in order to demodulate the first-node-transmission-data;
each additional first-node-reception-module is configured to process the current level of the second-node-current-signal received from the associated additional second node in order to demodulate the second-node-transmission-data associated with the additional second node.

13. The power line communication system of claim 1, wherein the second-node-transmission-module comprises:
a variable current source that is connected between a reference terminal and the second-node-input-voltage-terminal, and wherein the second node is configured to modulate the current level of the variable current source based on the second-node-transmission-data.

14. The power line communication system of claim 13, wherein the second-node-transmission-module further comprises:
a capacitor connected between the reference terminal and the second-node-input-voltage-terminal.

15. The power line communication system of claim 1, wherein the first-node-transmission-module comprises:
a variable current source that is connected between a reference terminal and the second-node-connection-terminal;
a transmission-switch, which is connected in series between a first-node-transmission-module-input-terminal and the second-node-connection-terminal;
a resistor that is connected in parallel with the transmission-switch, such that it is also connected in series between the first-node-transmission-module-input-terminal and the second-node-connection-terminal;
wherein the first node is configured to modulate the current level of the variable current source based on the first-node-transmission-data; and
wherein the first node is configured to close the transmission-switch when the first-node-transmission-module is transmitting.

16. The power line communication system of claim 15, wherein the first-node-transmission-module further comprises:
a capacitor that is connected between the reference terminal and the second-node-connection-terminal.

17. An automobile access system comprising the power line communication system of claim 1.

18. The automobile access system of claim 17, wherein the second node comprises an ultra-wideband anchor.

19. A method of operating a power line communication system, wherein the power line communication system comprises a first node and a second node, and wherein the method comprises:
the first node:
providing a first-node-output-signal to a second-node-connection-terminal of the first node; and
modulating the voltage level of the first-node-output-signal based on first-node-transmission-data;
the second node:
receiving the first-node-output-voltage-signal from the first node at a second-node-input-voltage-terminal of the second node, and using the first-node-output-voltage-signal as a supply voltage for the second node;
providing a second-node-current-signal to the second-node-input-voltage-terminal for transmission to the second-node-connection-terminal of the first node; and
modulating the current level of the second-node-current-signal based on second-node-transmission-data;
processing the voltage level of the received first-node-output-signal in order to demodulate the first-node-transmission-data;
the first node:
processing the current level of the second-node-current-signal received from the second node at the second-node-connection-terminal in order to demodulate the second-node-transmission-data.

20. The method of claim 19, wherein the power line communication system further comprises one or additional second nodes, and wherein the first node comprises one or more additional second-node-connection-terminals each of which is associated with a respective one of the one or more additional second nodes, and wherein the method comprises:
each additional second node:
receiving the first-node-output-voltage-signal from the first node at a second-node-input-voltage-terminal of the additional second node, and using the first-node-output-voltage-signal as a supply voltage for the additional second node;

providing a second-node-current-signal to the second-node-input-voltage-terminal for transmission to the associated second-node-connection-terminal of the first node;

modulating the current level of the second-node-current-signal based on second-node-transmission-data; and processing the voltage level of the received first-node-output-signal in order to demodulate the first-node-transmission-data; and the first node:

processing the current level of the second-node-current-signal received from each of the one or more additional second nodes at the associated additional second-node-connection-terminal in order to demodulate the second-node-transmission-data from each additional second node.

* * * * *